United States Patent
Boardman, IV (10) Patent No.: US 8,138,654 B2
(45) Date of Patent: Mar. 20, 2012

(54) SYSTEM AND METHOD FOR GENERATOR STATOR MOUNTING

(75) Inventor: William Hunter Boardman, IV, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 12/468,680

(22) Filed: May 19, 2009

(65) Prior Publication Data
US 2010/0295408 A1 Nov. 25, 2010

(51) Int. Cl.
*H02K 1/06* (2006.01)
*H02K 1/18* (2006.01)
*H02K 1/28* (2006.01)

(52) U.S. Cl. ... 310/216.129; 310/216.007; 310/216.009; 310/216.051; 310/216.055; 310/216.086; 310/419; 310/418; 310/431; 310/422

(58) Field of Classification Search .......... 310/216.007–216.009, 216.051, 310/216.055, 216.086, 216.049, 216.113, 310/216.129, 216.131, 216.105, 422, 431, 310/433, 418, 419; *H02K 1/06, 1/18, 1/28*
See application file for complete search history.

(56) References Cited

U.S. PATENT DOCUMENTS

| | | | |
|---|---|---|---|
| 4,051,399 A | 9/1977 | Stanwick et al. | |
| 4,634,909 A | 1/1987 | Brem | |
| 4,810,919 A * | 3/1989 | Ponce et al. | 29/596 |
| 4,891,540 A | 1/1990 | Cooper et al. | |
| 4,916,803 A * | 4/1990 | Estrada | 29/596 |
| 6,346,760 B1 * | 2/2002 | Boardman, IV | 310/216.007 |
| 6,448,686 B1 | 9/2002 | Dawson et al. | |
| 6,766,572 B2 | 7/2004 | Dawson et al. | |
| 7,202,587 B2 * | 4/2007 | Sargeant et al. | 310/418 |
| 7,923,890 B2 * | 4/2011 | Boardman et al. | 310/216.129 |
| 2007/0090701 A1 * | 4/2007 | Down et al. | 310/51 |

FOREIGN PATENT DOCUMENTS
WO 0057535 A1 9/2000

OTHER PUBLICATIONS

GB Search Report issued in connection with corresponding GB Application No. GB1007933.3 relating to claims 14 to 20, Feb. 3, 2011.
GB 1007933.3, Search Report and Written Opinion, Sep. 13, 2010.

* cited by examiner

*Primary Examiner* — Quyen Leung
*Assistant Examiner* — Terrance Kenerly
(74) *Attorney, Agent, or Firm* — Fletcher Yoder P.C.

(57) ABSTRACT

In one embodiment, a system includes a stator mounting kit that includes multiple radial adjustment shims having different thicknesses from one another. The stator mounting kit also includes multiple stator alignment adapters having different circumferential alignments between a keybar mount and a spring bar mount. The stator mounting kit is configured to enable radial and circumferential alignment between each spring bar and respective keybar in a stator framework via selection of one of the stator alignment adapters and selection of one or more of the radial adjustment shims.

14 Claims, 8 Drawing Sheets

SYSTEM AND METHOD FOR GENERATOR STATOR MOUNTING

BACKGROUND OF THE INVENTION

The subject matter disclosed herein relates to a generator, and more specifically, to a system for mounting a stator in a generator.

Generators typically employ a combination of a rotor and a stator to convert rotational energy into electrical energy. The stator generally includes multiple laminated core segments stacked within an annular frame. In certain generator designs, multiple circumferentially spaced keybars are aligned with the longitudinal axis of the annular frame and bolted to spring bars disposed on each circumferential side of the keybars. The spring bars are, in turn, bolted to the annular frame. Dovetails within each keybar align with corresponding notches around the circumference of the stator core segments to secure the core to the annular frame. Unfortunately, due to tight tolerances between the dovetails and the notches, the frame is generally precisely machined to properly locate the keybars. This type of machining is both costly and requires extensive cleaning to remove metal shavings prior to assembly of the generator. Alternatively, the keybars and spring bars may be welded to the frame. However, such an arrangement results in weld distortion, thereby increasing the difficulty of maintaining proper keybar alignment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a generator that includes a rotor having a rotational axis, a stator disposed about the rotor, and a framework disposed about the stator. The framework includes an outer annular support, a spring bar coupled to the outer annular support, where the spring bar is aligned with the rotational axis, and a keybar coupled to the stator, where the keybar is aligned with the rotational axis. The framework also includes an alignment adapter disposed radially between the spring bar and the keybar, where the alignment adapter includes outer and inner recesses disposed radially opposite from one another relative to the rotational axis. The outer recess is configured to hold the spring bar, the inner recess is configured to hold the keybar, and the alignment adapter is configured to align the keybar to the stator in a circumferential direction via a circumferential position of the outer recess relative to the inner recess.

In a second embodiment, a system includes a stator mounting system that includes multiple spring bars configured to mount to an annular frame in a first circumferentially spaced arrangement about a longitudinal axis of the annular frame. The stator mounting system also includes multiple keybars configured to mount to a stator in a second circumferentially spaced arrangement about the longitudinal axis. Furthermore, the stator mounting system includes an H-beam positioned radially between each spring bar and each keybar. Each H-beam is configured to block circumferential movement of the respective keybar relative to the respective spring bar, and each H-beam is selectable from a set of H-beams having different alignment dimensions configured to facilitate circumferential alignment of the respective keybar relative to the respective spring bar.

In a third embodiment, a system includes a stator mounting kit that includes multiple radial adjustment shims having different thicknesses from one another. The stator mounting kit also includes multiple stator alignment adapters having different circumferential alignments between a keybar mount and a spring bar mount. The stator mounting kit is configured to enable radial and circumferential alignment between each spring bar and respective keybar in a stator framework via selection of one of the stator alignment adapters and selection of one or more of the radial adjustment shims.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may reduce the cost of generator construction by obviating the step of machining keybar dovetails after installation and/or avoiding rework associated with weld distortion (e.g., heating, jacking, and/or cutting out welds). Furthermore, certain embodiments may obviate extensive cleaning prior to stator core assembly, thereby reducing cost and decreasing cycle time associated with the manufacturing process. Specifically, certain embodiments may provide interface parts to facilitate radial and circumferential adjustment of each keybar relative to a respective spring bar. In such configurations, spring bars may be bolted and/or welded to the frame without utilizing complex and time-consuming machining or engaging in rework associated with weld distortion, because the interface parts may compensate for any variations in spring bar alignment and facilitate proper keybar placement with respect to the stator. Certain embodiments may include multiple circumferentially spaced spring bars aligned with a longitudinal axis of an annular frame and secured to the annular frame. Such embodiments may also include multiple keybars positioned substantially parallel to the spring bars and secured to a stator. Multiple H-beams may be disposed between each keybar and a respective spring bar to block circumferential movement of the keybar with respect to the spring bar. In this configuration, each spring bar may be disposed within a radially outward cavity of each H-beam, while each keybar is disposed within a radially inward cavity of each H-beam. The radially inward cavity may be circumferentially offset from the radially outward cavity to properly align the keybar with the stator. During fabrication of the generator, H-beams may be selected from a discrete set, each having a different circumferential offset, to compensate for any circumferential variations in spring bar placement. In addition, a shim may be sandwiched between the radially inward cavity of each H-beam and a respective keybar. This shim may facilitate radial adjustment of the keybar with respect to the spring bar. During generator fabrication, each shim may be selected from a discrete set of shims, each having a different thickness, to compensate for any radial variations in spring bar placement. In certain embodiments, each keybar is secured to a respective spring bar in the radial direction by multiple bolts passing through a respective spring bar and H-beam.

Figure 1:
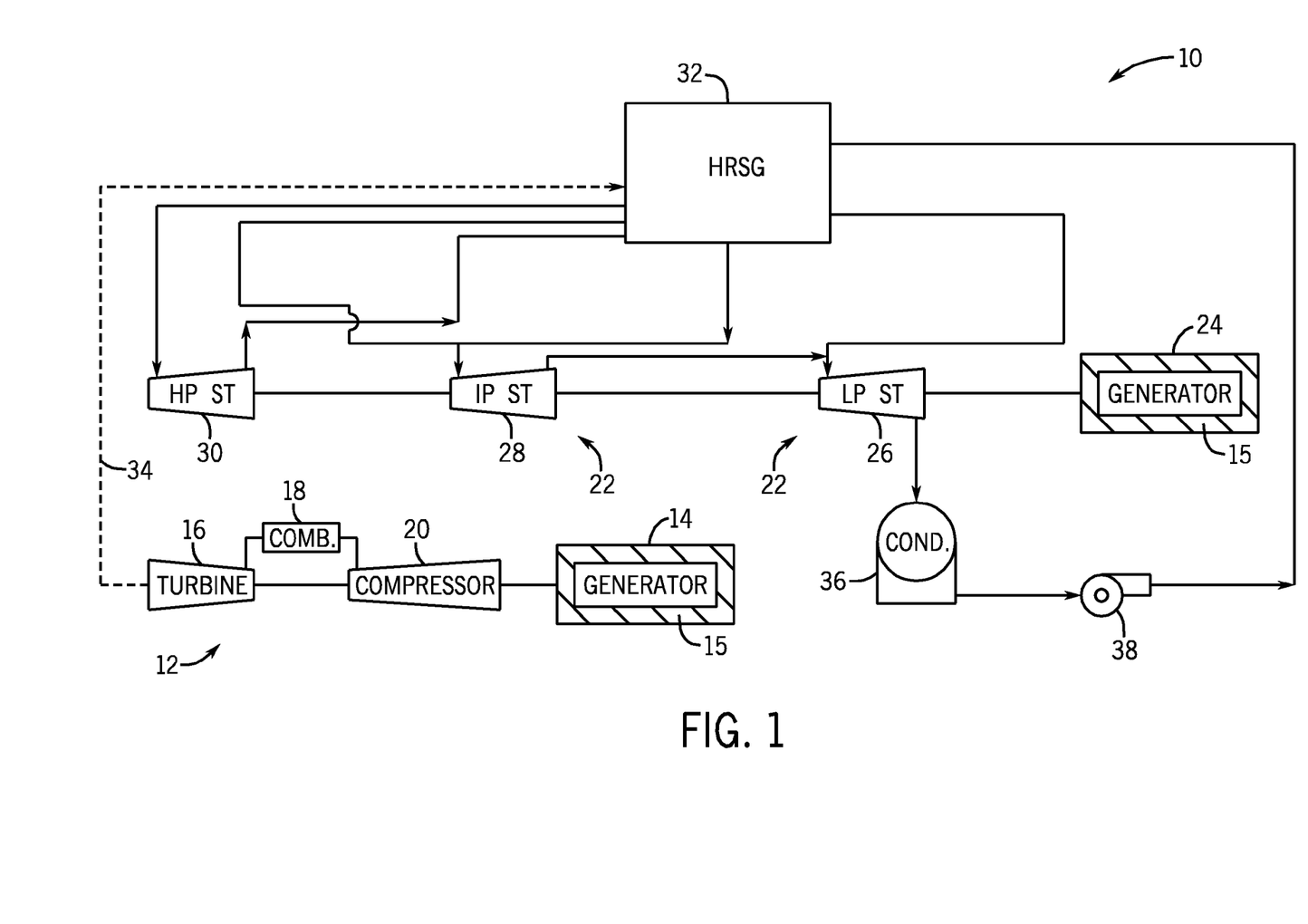
FIG. 1 is a schematic flow diagram of an embodiment of a combined cycle power generation system having a gas turbine, a steam turbine, an HRSG, and generators that include frames configured to reduce machining costs in accordance with certain embodiments of the present technique.

FIG. 1 is a schematic flow diagram of an embodiment of a combined cycle power generation system 10 having a gas turbine, a steam turbine, and a heat recovery steam generator (HRSG). The system 10 is described below for the purpose of providing context for embodiments of unique generator configurations that may reduce frame construction costs. It should be appreciated that the generator embodiments described below may be incorporated into other power generation systems. The system 10 may include a gas turbine 12 for driving a first generator 14 for producing electrical power. In the present embodiment, generator 14 includes a vibration isolation system 15 configured to mount a stator to an annular frame of the generator 14, while absorbing vibrations. The vibration isolation system 15 may include certain features configured to decrease construction costs associated with generator assembly by reducing machining operations. The gas turbine 12 may include a turbine 16, a combustor or combustion chamber 18, and a compressor 20. The system 10 may also include a steam turbine 22 for driving a second generator 24. The second generator 24 may also include a vibration isolation system 15 configured to reduce generator assembly costs. In addition, although the gas turbine 12 and steam turbine 22 may drive separate generators 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

Figure 2:
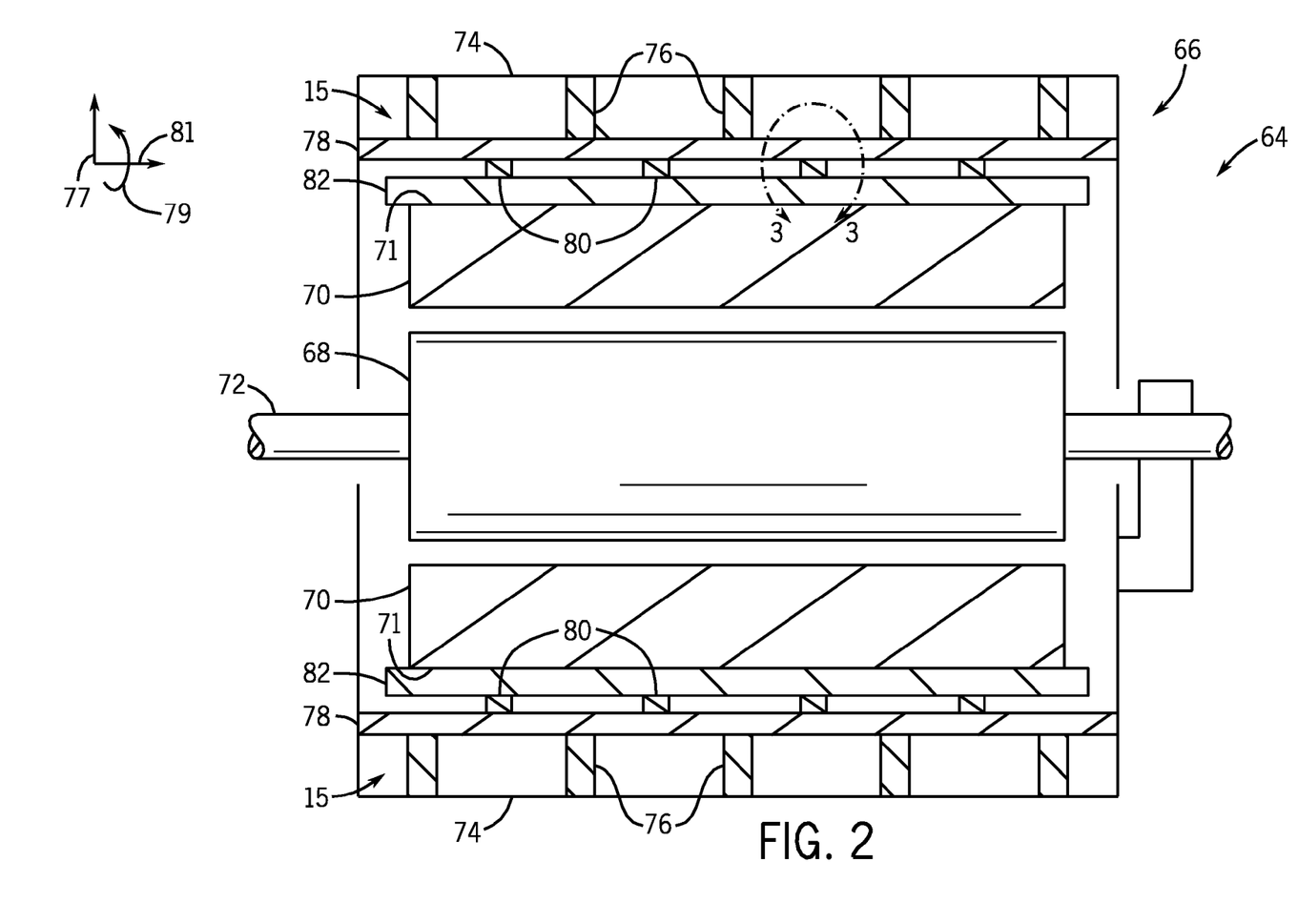
FIG. 2 is a cross-sectional side view of a generator, as shown in FIG. 1, in accordance with certain embodiments of the present technique.

FIG. 2 is a cross-sectional side view of a generator 64 that may serve as the generator 14 and/or generator 24 in the combined cycle power generation system 10, or various other power generation systems. The generator 64 includes an annular frame 66, a rotor 68, a stator 70 and a shaft 72. The shaft 72 may be driven to rotate by a gas turbine 12, a steam turbine 22, a wind turbine, a hydro turbine, an internal combustion engine, or any other suitable device configured to provide a rotational output. The shaft 72 is coupled to a substantially cylindrical rotor 68 that may include a wire winding about a magnetic core. The rotor 68 is disposed within a stator 70 configured to provide a stationary magnetic field. As appreciated, rotation of the rotor 68 within the stator 70 may generate electrical current within the wire winding, thereby producing an electrical output from the generator 64.

The stator 70 is supported within a casing 74 of the annular frame 66 by the vibration isolation system or framework 15, which includes outer annular supports or section plates 76, outer axial bars or spring bars 78, alignment adapters or interface parts 80, and inner axial bars or keybars 82. The stator 70 may include multiple laminated core segments, each having circumferentially spaced notches 71. Each notch 71 may be configured to interlock with a dovetail portion of each keybar 82, securing the core segments to the keybars 82. The keybars 82 may be equally spaced about the circumference of the annular frame 66 at locations corresponding to the stator notches 71. The keybars 82 may be secured to spring bars 78 via a stator mounting kit or interface parts 80. As discussed in detail below, the interface parts 80 may include H-beams and shims. The spring bars 78 are coupled to the section plates 76 to secure the stator support components to the annular frame 66. This configuration may serve to dampen vibrations within generator 64. Specifically, vibrations from the stator 70 are transmitted to spring bars 78 via keybars 82 and interface parts 80. As illustrated, the interface parts 80 are connected to the spring bars 78 at the approximate midpoint axially between section plates 76. In this configuration, the spring bars 78 may flex in a radial direction 77 and/or a circumferential direction 79, thereby dissipating vibrational energy. Furthermore, as discussed in detail below, the interface parts 80 may include features that facilitate adjustment of keybar position relative to the spring bars 78 in both the radial direction 77 and the circumferential direction 79. This configuration may enable less accurate positioning of the spring bars 78 with respect to the annual frame 66, because the interface parts 80 may compensate for any variations in spring bar alignment and facilitate proper keybar placement with respect to the stator 70. Therefore, the cost of generator frame construction may be reduced because the spring bars 78 may be coupled to the section plates 76 without expensive and time-consuming machining operations.

Figure 3:
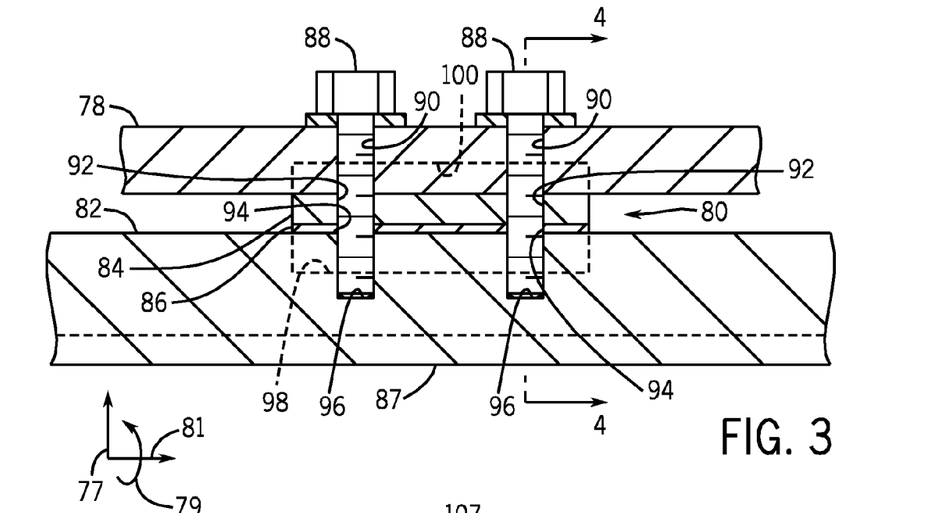
FIG. 3 is a cross-sectional side view of a spring bar, interface parts and a keybar, as taken within line 3-3 of FIG. 2, in accordance with certain embodiments of the present technique.

FIG. 3 is a cross-sectional side view of the spring bar 78, interface parts 80 and the keybar 82, as taken within line 3-3 of FIG. 2. The interface parts 80 include a stator alignment adapter or H-beam 84, and a shim 86. The H-beam 84 is configured to secure the keybar 82 to the spring bar 78 in the circumferential direction 79. As discussed in detail below, the keybar 82 is disposed within a keybar mount (i.e., radially inward recess or cavity 98) of the H-beam 84, and the spring bar 78 is disposed within a spring bar mount (i.e., radially outward recess or cavity 100). In this configuration, the H-beam 84 may block circumferential movement of the keybar 82 with respect to the spring bar 78. In addition, the H-beam 84 may be configured such that the keybar 82 is circumferentially offset from the spring bar 82. In this manner, the keybar 82 may be precisely aligned with the stator 70 despite variations in alignment between the spring bar 78 and the annular frame 66. Specifically, keybars 82 may be positioned within a circumferential tolerance of approximately 0.015 inches relative to the stator 70 to ensure that keybar dovetails 87 properly align with stator notches 71. Alternative embodiments may employ larger or smaller keybar 82 tolerances such as between approximately 0.005 to 0.05 inches, 0.01 to 0.03 inches, or 0.015 to 0.02 inches, for example. The adjustable H-beam 84 configuration may enable the circumferential spring bar 78 tolerance to be significantly larger than the keybar 82 tolerance because the H-beam 84 may compensate for variations in spring bar 78 position. For example, the circumferential spring bar 78 tolerance may be between approximately 0.05 to 0.3 inches, 0.07 to 0.2 inches, 0.09 to 0.15 inches, or approximately 0.1 inches. By way of example, if the circumferential keybar 82 tolerance is 0.015 inches and the circumferential spring bar 78 position is 0.05 inches from ideal alignment, an H-beam 84 employing a 0.04 inch offset may be employed to shift the keybar 82 to 0.01 inches from ideal alignment, thereby placing the keybar 82 within the specified circumferential tolerance. Because the larger spring bar 78 tolerance may enable the spring bars 78 to be coupled to the annular frame 66 without expensive and time-consuming machining operations, generator construction costs and/or reworking operations may be reduced.

Furthermore, the shim 86 may be employed to facilitate radial adjustment of the keybar 82 relative to the spring bar 78. In this configuration, the keybar 82 may be precisely positioned in the radial direction 77 relative to the stator 70 despite radial variations in spring bar 78 position with respect to the annular frame 66. Specifically, one or more shims 86 may be positioned between the keybar 82 and the H-beam 84 and/or the spring bar 78 and the H-beam 84 to properly align the keybar dovetail 87 with the respective stator notch 71. For example, keybars 82 may be positioned within a radial tolerance of approximately 0.005 to 0.05 inches, 0.01 to 0.03 inches, 0.015 to 0.02 inches, or about 0.015 inches relative to the stator 70. In contrast, the radial spring bar 78 tolerance may be between approximately 0.05 to 0.3 inches, 0.07 to 0.2 inches, 0.09 to 0.15 inches, or approximately 0.1 inches. The shim 86 may serve to compensate for the larger radial spring bar 78 tolerance and properly align the keybar 82 in the radial direction 77 relative to the stator 70. By way of example, if the radial keybar tolerance is 0.015 inches and the radial spring bar position is 0.05 inches from ideal alignment, a shim 86 having a 0.04 inch thickness may be employed to radially shift the keybar 82 to 0.01 inches from ideal alignment, thereby placing the keybar 82 within the specified radial tolerance. In certain embodiments, the spring bar 78 may be offset radially outward from the stator 70 by a desired distance substantially equal to the radial spring bar 78 tolerance. For example, the desired distance may be approximately 0.05 to 0.3 inches, 0.07 to 0.2 inches, 0.09 to 0.15 inches, or about 0.1 inches. In this configuration, the spring bar 78 may not extend radially inward past the ideal alignment position. Therefore, a shim 86 may be employed to compensate for the radial offset and properly align the keybar 82 relative to the stator 70. Because the larger spring bar 78 tolerance may enable the spring bars 78 to be coupled to the annular frame 66 without expensive and time-consuming machining operations, generator construction costs and/or reworking operations may be reduced.

The keybar 82 may be secured to the spring bar 78 in the radial direction 77 by bolts 88. While two bolts 88 per H-beam 84 are illustrated in the present embodiment, it should be appreciated that more or fewer bolts 88 may be employed in alternative embodiments. For example, in certain embodiments, 1, 3, 4, 5, 6, or more bolts 88 per H-beam 84 may be utilized to secure the keybar 82 to the spring bar 78 in the radial direction 77. As illustrated, the bolts 88 pass through bolt holes 90 in the spring bar 78, bolt holes 92 in the H-beam 84, and bolt holes 94 in the shim 86. The bolts 88 terminate within a recess 96 in the keybar 82. In certain embodiments, the bolts 88 may be threaded and the recess 96 may include complementary tapped grooves (e.g., mating threads) configured to mate with the threads, thereby securing the bolts 88 to the keybar 82. This configuration may ensure that the keybar 82 is rigidly mounted to the spring bar 78 in the radial direction 77. However, as discussed in detail below, a width of the bolt holes 90, 92 and 94 in the circumferential direction 79 may be greater than a diameter of the bolts 88. In this configuration, the bolts 88 may not block circumferential movement of keybar 82 relative to the spring bar 78. Instead, the H-beams 84 may be configured to resist circumferential loads from the keybar 82, thereby substantially reducing or eliminating shear forces on the bolts 88. This configuration may reduce generator construction costs by employing less expensive, lower grade bolts 88.

Figure 4:
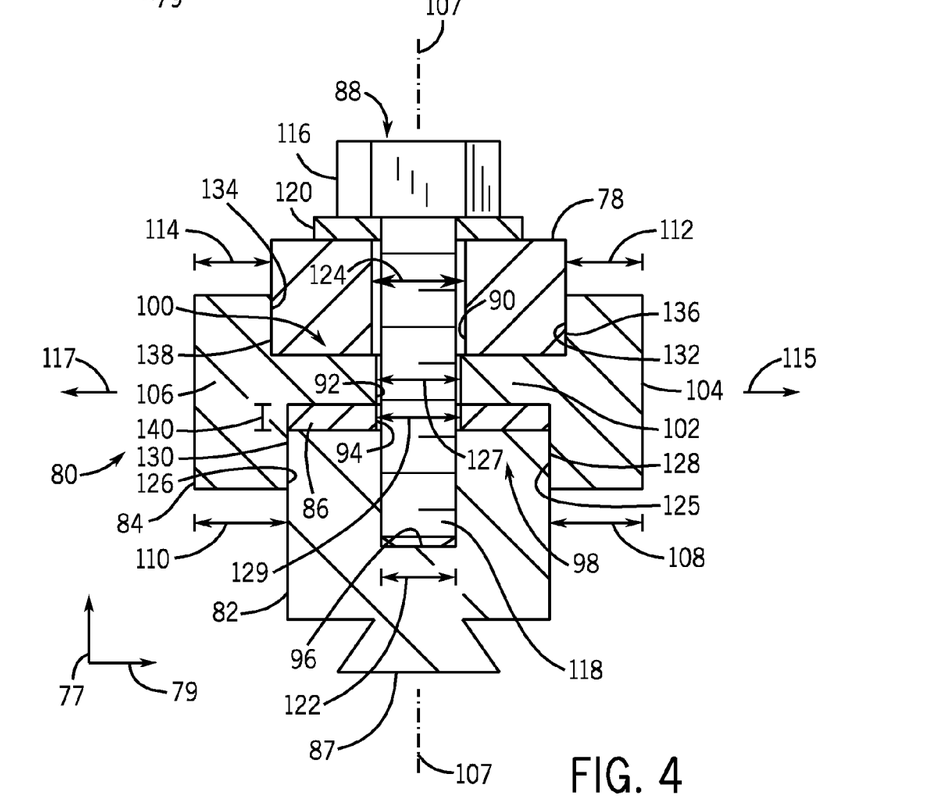
FIG. 4 is a cross-sectional front view of the spring bar, interface parts and the keybar, as taken along line 4-4 of FIG. 3, in accordance with certain embodiments of the present technique.

FIG. 4 is a cross-sectional front view of the spring bar 78, interface parts 80 and the keybar 82, as taken along line 4-4 of FIG. 3. In the illustrated embodiment, the keybar 82 is substantially aligned with the spring bar 78 in the circumferential direction 79. Specifically, the keybar 82 is disposed within a radially inward cavity 98 of the H-beam 84, and the spring bar 78 is disposed within a radially outward cavity 100. The radially inward cavity 98 and the radially outward cavity 100 are substantially aligned in the circumferential direction 79. The H-beam 84 includes a web 102, a first flange 104 and a second flange 106, forming both the radially inward cavity 98 and the radially outward cavity 100. In the present configuration, a width 108 of the radially inward portion of the first flange 104 is substantially similar to a width 110 of the radially inward portion of the second flange 106, thereby substantially centering the radially inward cavity 98 between the flanges 104 and 106. Similarly, a width 112 of the radially outward portion of the first flange 104 is substantially similar to a width 114 of the radially outward portion of the second flange 106, thereby substantially centering the radially outward cavity 100 between the flanges 104 and 106. In other words, the cavities 98 and 100, and the flanges 104 and 106 may be circumferentially centered about a central radial axis 107. Because both cavities 98 and 100 are substantially centered, the H-beam 84 serves to substantially align the keybar 82 with the spring bar 78 in the circumferential direction 79. As discussed in detail below, alternative H-beams 84 may be configured to circumferentially offset the keybar 82 relative to the spring bar 78 in a first circumferential direction 115 or a second circumferential direction 117. In this manner, the keybar dovetail 87 may be precisely aligned with the respective stator notch 71 despite variations in circumferential alignment between the spring bar 78 and the annular frame 66. This configuration may reduce generator construction costs compared to embodiments employing machined frames 66 and precisely aligned spring bars 78.

As previously discussed, the keybar 82 is secured to the spring bar 78 in the radial direction 77 by bolts 88. Each bolt 88 includes a head 116 and a shaft 118 that passes through bolt hole 90 in the spring bar 78, bolt hole 92 in the H-beam 84, and bolt hole 94 in the shim 86. The shaft 118 may be secured to the keybar 82 by a threaded connection, for example. In the present embodiment, a washer 120 is sandwiched between the head 116 of the bolt 88 and the spring bar 78. The washer 120 may serve to distribute a compressive load from the head 116 over a larger area of the spring bar 78. In certain embodiments, the head 116 may include a hex-pattern to enable the bolt 88 to be secured with a wrench, for example.

As previously discussed, the bolt 88 may not block circumferential movement of the keybar 82 with respect to the spring bar 78. Specifically, a diameter 122 of the shaft 118 may be less than a circumferential width 124 of the bolt hole 90, a circumferential width 127 of the bolt hole 92, and a circumferential width 129 of the bolt hole 94. In this configuration, movement of each bolt 88 with respect to the spring bar 78, the H-beam 84 and the shim 86 is unrestricted by the respective bolt holes 90, 92 and 94 in the circumferential direction 79. This configuration may limit the shear force applied to each bolt 88, thereby reducing generator construction costs by enabling the use of less expensive, lower grade bolts 88.

Movement of the keybar 82 relative to the spring bar 78 in the circumferential direction 79 may be limited by contact between the spring bar 78, the H-beam 84, and the keybar 82. Specifically, any force applied to keybar 82 in the circumferential direction 79 may be transferred to the H-beam 84 by contact between a first outer surface 125 and/or a second outer surface 126 of keybar 82, and a first inner surface 128 and/or a second inner surface 130 of the radially inward cavity 98. Similarly, any force applied to the H-beam 84 by the keybar 82 in the circumferential direction 79 may be transferred to the spring bar 78 by contact between a first outer surface 132 and/or a second outer surface 134 of the spring bar 78, and a first inner surface 136 and/or a second inner surface 138 of the radially outward cavity 100. As previously discussed, the spring bar 78 may be welded and/or bolted to the annular frame 66, thereby blocking circumferential movement of the spring bar 78. Therefore, the H-beam 84 may serve to block circumferential movement of the keybar 82 relative to the annular frame 66. For example, if the stator 70 applies a circumferential force to the dovetail 87 along direction 117, the keybar 82 may be urged toward direction 117. However, movement of the keybar 82 may be blocked by contact between the second outer surface 126 of the keybar 82 and the second inner surface 130 of the radially inward cavity 98. Similarly, movement of the H-beam 84 in direction 117 may be blocked by contact between the H-beam 84 and the spring bar 78. Specifically, contact between the outer surface 132 of the spring bar 78 and the first inner surface 136 of the radially outward cavity 100 may urge the spring bar 78 in direction 117. However, because the spring bar 78 is secured to the annular frame 66, movement of the spring bar 78 may be blocked. Therefore, the H-beam 84 may block movement of the keybar 82 relative to the annular frame 66.

In certain embodiments, the H-beam 84 is configured to resist a fault torque. A fault torque results from an unexpected condition within the electrical power generation system such as a short circuit. In certain embodiments, H-beam 84 is configured to resist a fault torque that is about 1.2, 1.4, 1.6, 1.8, 2, 2.2, 2.4, 2.6, 2.8, 3, or more times the normal operating load for a particular generator configuration. As appreciated, web and flange thickness, H-beam length and/or material properties of the H-beam 84 may be particularly selected to resist such loads. For example, a thickness of the web 102, the first flange 104 and/or the second flange 106 may be between approximately 0.25 to 2.5 inches, 0.5 to 2 inches, 0.75 to 1.5 inches, or about 1 inch. Furthermore, a length of the H-beam 84 may be between approximately 1 to 10, 2 to 8, 3 to 7, 4 to 6, or about 5 inches. The H-beam 84 may be constructed from composite materials, aluminum, steel (e.g., grade 1018 steel), or other suitable materials.

As previously discussed, the shim 86 may be disposed within the radially inward cavity 98 (i.e., sandwiched between the H-beam 84 and the keybar 82) and/or the radially outward cavity 100 (i.e., sandwiched between the H-beam 84 and the spring bar 78). The shim 86 may be used to adjust the radial position of the keybar 82 with respect to the stator 70. In certain embodiments, a thickness 140 of the shim 86 may be selected from a set of shims, each having an equal thickness or a different thickness 140. For examples, shims 86 may be between approximately 0 to 500, 5 to 500, 5 to 300, or 10 to 100 mils thick. By further example, shims 86 may be about 5, 10, 15, 20, 30, 40, 50, 60, 70, or more mils thick. Furthermore, multiple shims 86 may be stacked between the H-beam 84 and the keybar 82. For example, a 10 mil shim may be combined with a 20 mil shim to establish a 30 mil offset. Because the shims 86 facilitate radial adjustment of the keybars 82, keybar position may be varied during attachment of the stator 70 to the frame 66. Specifically, by adjusting keybar position, the dovetails 87 may be properly aligned within corresponding stator notches 71 without additional welding or machining operations that may contaminate the assembly. The interface parts 80 (i.e., the H-beam 84 and the shim 86) may enable radial and circumferential alignment of the keybar 82 with the stator 70 despite variations in spring bar position with respect to the annular frame 66. Therefore, the spring bar 78 may be coupled to the annular frame 66 without expensive and time-consuming machining operations, thereby reducing generator construction costs.

Figure 5:
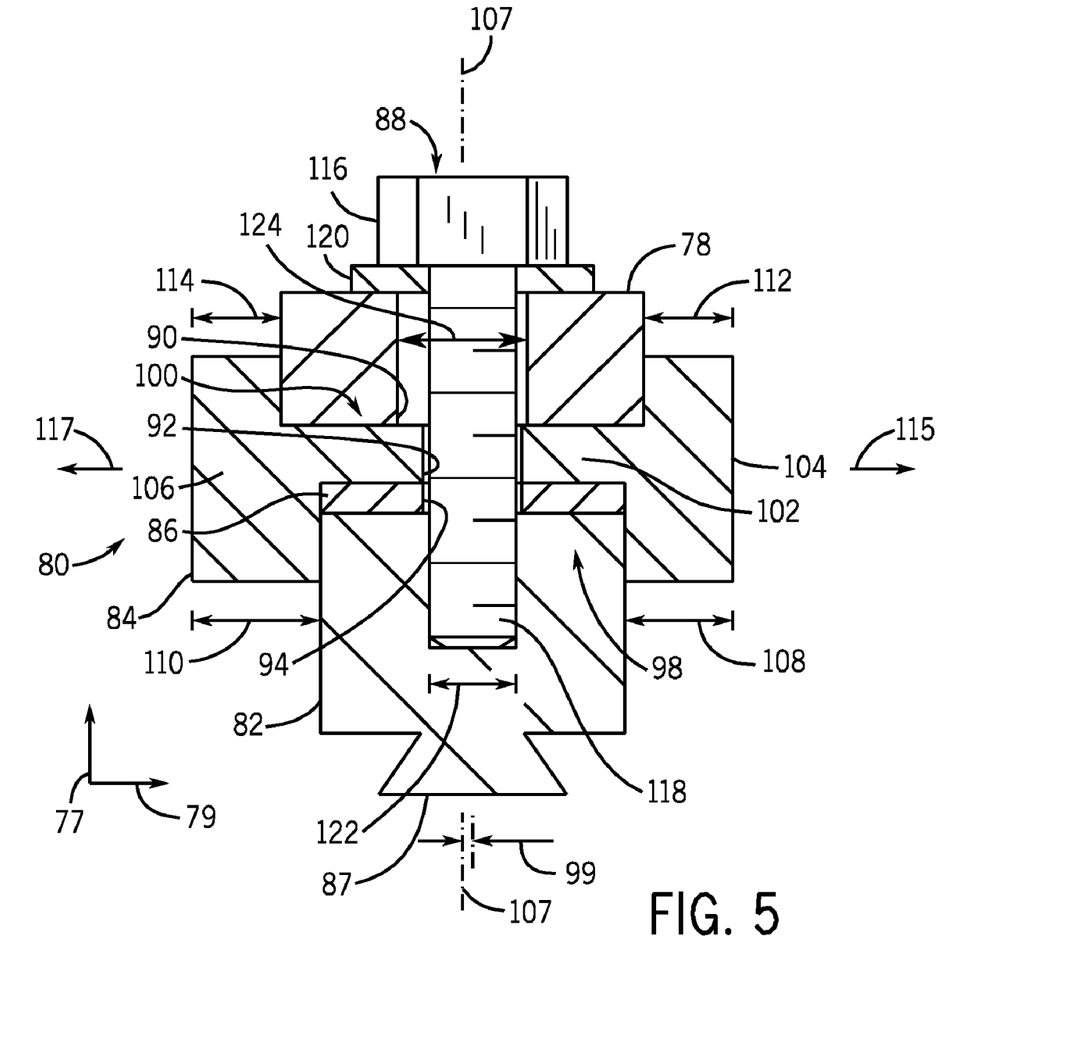
FIG. 5 is a cross-sectional front view of the spring bar, interface parts and the keybar, as shown in FIG. 4, with an H-beam configured to offset the keybar relative to the spring bar in a first circumferential direction in accordance with certain embodiments of the present technique.

FIG. 5 is a cross-sectional front view of the spring bar 78, interface parts 80 and the keybar 82, as shown in FIG. 4, with an H-beam 84 configured to offset the keybar 82 relative to the spring bar 78 in the circumferential direction 115. Specifically, the radially inward cavity 98 is circumferentially offset from the radially outward cavity 100 in direction 115 relative to axis 107. In the present configuration, the width 108 of the radially inward portion of the first flange 104 is less than the width 110 of the radially inward portion of the second flange 106. However, the width 112 of the radially outward portion of the first flange 104 is substantially similar to the width 114 of the radially outward portion of the second flange 106. In other words, the cavity 98 is off center by a circumferential offset 99 from the axis 107 in the direction 115, whereas the cavity 100 is centered relative to the axis 107. Therefore, the radially inward cavity 98 is shifted in direction 115 relative to the radially outward cavity 100. Such a configuration may be employed if the stator notch 71 is offset in direction 115 relative to the spring bar 78. By utilizing an H-beam 84 configured to offset the keybar 82 in direction 115, the keybar dovetail 87 may be precisely aligned with the respective stator notch 71 despite variations in alignment between the spring bar 78 and the annular frame 66. This configuration may reduce generator construction costs compared to embodiments employing machined frames 66 and precisely aligned spring bars 78.

The degree of circumferential offset 99 between the radially inward cavity 98 and the radially outward cavity 100 may be particularly selected to properly align each dovetail 87 with each stator notch 71. In certain embodiments, the H-beam 84 may be selected from a set of H-beams having varying degrees of offset 99. For example, the radially inward cavity 98 may be between approximately 0 to 500, 5 to 500, 5 to 300, or 10 to 100 mils circumferentially offset 99 from the radially outward cavity 100. By further example, the radially inward cavity 98 may be about 5, 10, 15, 20, 30, 40, 50, 60, 70, or more mils circumferentially offset 99 from the radially outward cavity 100. In such a configuration, a circumferential offset distance between the spring bar 78 and the stator notch 71 may be measured, and a proper H-beam 84 may be selected and installed. This configuration may enable less accurate positioning of the spring bars 78 with respect to the annual frame 66, because the H-beams 84 may compensate for any variations in spring bar 78 alignment and facilitate proper keybar 82 placement with respect to the stator 70. Therefore, the cost of generator frame construction may be reduced because the spring bars 78 may be coupled to the section plates 76 without expensive and time-consuming machining operations.

Because the bolt 88 is secured to the keybar 82, offsetting the keybar 82 relative to the spring bar 78 in the circumferential direction 79 causes the bolt 88 to translate within the bolt hole 90. Specifically, the bolt 88 translates a distance substantially equal to the offset 99. Therefore, the circumferential width 124 of the bolt hole 90 may be configured to accommodate bolt movement equal to the maximum offset distance. For example, if the maximum offset 99 distance is 70 mils, the width 124 of the bolt hole 90 may be substantially equal to or greater than the bolt diameter 122 plus twice the offset distance (e.g., 140 mils). Such a configuration may enable the H-beam 84 to offset the keybar 82 relative to the spring bar 78 without contact between the bolt 88 and the bolt hole 90.

Figure 6:
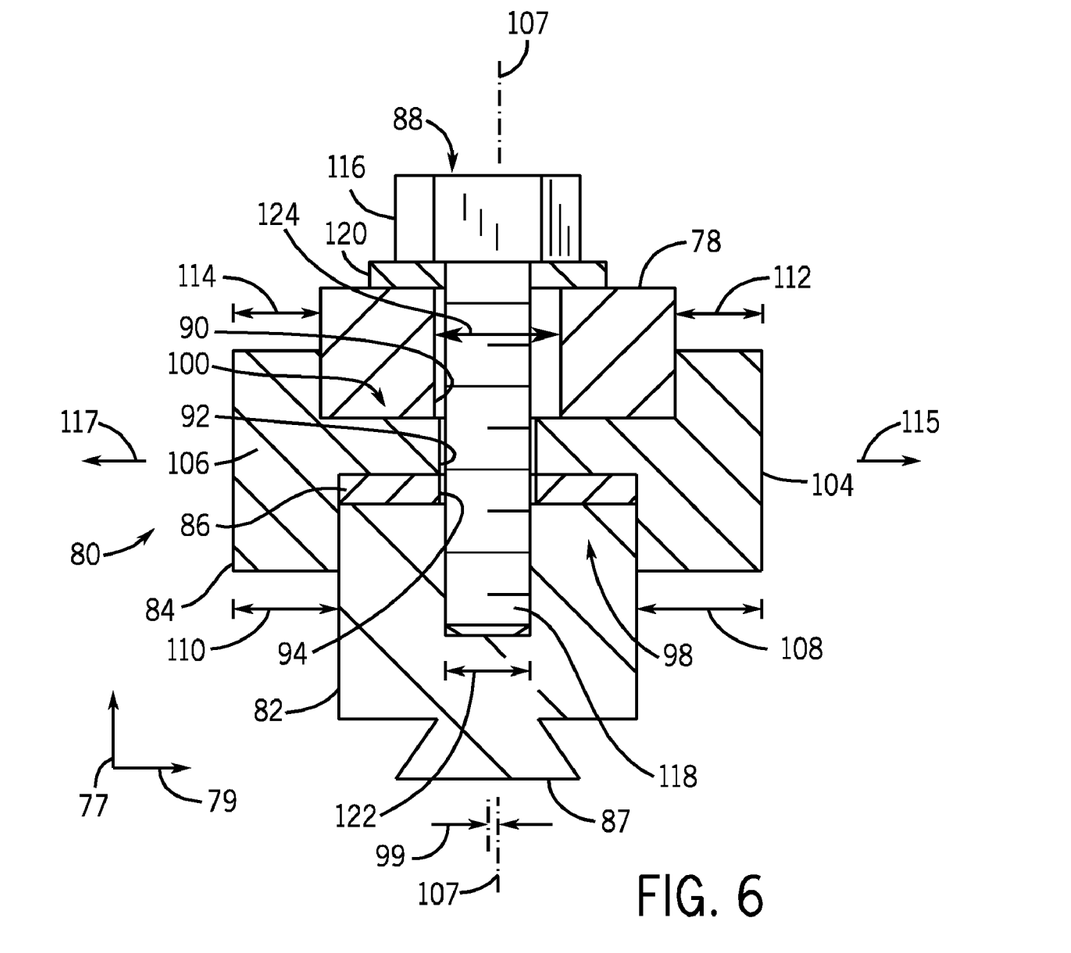
FIG. 6 is a cross-sectional front view of the spring bar, interface parts and the keybar, as shown in FIG. 4, with an H-beam configured to offset the keybar relative to the spring bar in a second circumferential direction in accordance with certain embodiments of the present technique.

FIG. 6 is a cross-sectional front view of the spring bar 78, interface parts 80 and the keybar 82, as shown in FIG. 4, with an H-beam 84 configured to offset the keybar 82 relative to the spring bar 78 in the direction 117. Specifically, the radially inward cavity 98 is circumferentially offset from the radially outward cavity 100 in direction 117. In the present configuration, the width 108 of the radially inward portion of the first flange 104 is greater than the width 110 of the radially inward portion of the second flange 106. However, the width 112 of the radially outward portion of the first flange 104 is substantially similar to the width 114 of the radially outward portion of the second flange 106. In other words, the cavity 98 is off center by a circumferential offset 99 from the axis 107 in the direction 117, whereas the cavity 100 is centered relative to the axis 107. Therefore, the radially inward cavity 98 is shifted in direction 117 relative to the radially outward cavity 100. Such a configuration may be employed if the stator notch 71 is offset in direction 117 relative to the spring bar 78. By utilizing an H-beam 84 configured to offset the keybar 82 in direction 117, the keybar dovetail 87 may be precisely aligned with the respective stator notch 71 despite variations in alignment between the spring bar 78 and the annular frame 66. This configuration may reduce generator construction costs compared to embodiments employing machined frames 66 and precisely aligned spring bars 78.

As appreciated, a single H-beam 84 may be employed to offset the keybar 82 in either the direction 115 or the direction 117. Specifically, an H-beam 84 having a particular offset distance may be rotated approximately 180 degrees about the radial axis 77 (or axis 107) to change the offset direction. For example, if an H-beam 84 is configured to offset the keybar 82 by 20 mils in direction 115, the H-beam may be rotated 180 degrees about the radial axis 77 to offset the keybar 82 by 20 mils in the direction 117. This configuration may reduce the number of H-beams 84 within a set having varying degrees of offset.

Figure 7:
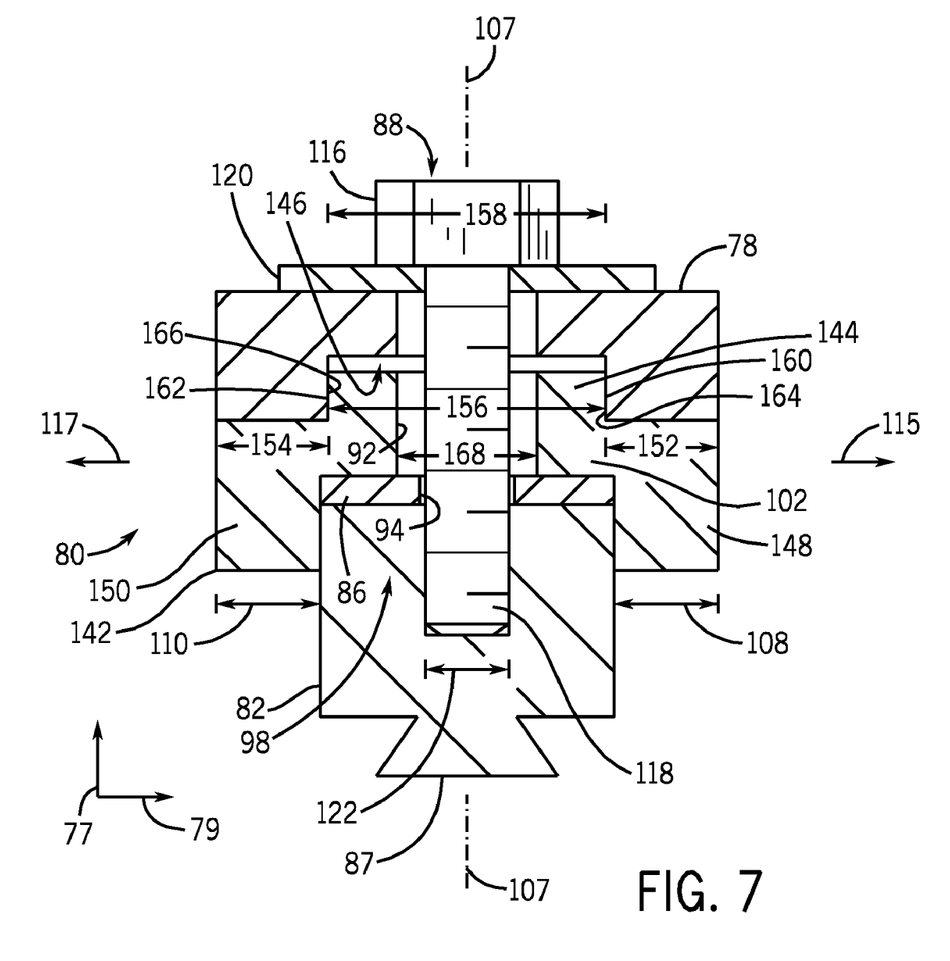
FIG. 7 is a cross-sectional front view of a first alternative embodiment of the spring bar, interface parts and the keybar in accordance with certain embodiments of the present technique.

FIG. 7 is a cross-sectional front view of a first alternative embodiment of the spring bar 78, interface parts 80 and the keybar 82. In the illustrated embodiment, the keybar 82 is substantially aligned with the spring bar 78 in the circumferential direction 79. However, the H-beam 84 described above with regard to FIGS. 4-6 has been replaced by an alternative stator alignment adapter 142, including a radially inward cavity 98 and a radially outward notch 144. The keybar 82 is disposed within the radially inward cavity 98, and the notch 144 is disposed within a machined recess 146 in the spring bar 78. The alignment adapter 142 includes a web 102, and a first flange 148 and a second flange 150, extending radially inward from the web 102 and forming the radially inward cavity 98. In the present configuration, a width 108 of the first flange 148 is substantially similar to a width 110 of the second flange 150, thereby substantially centering the radially inward cavity 98 between the flanges 148 and 150. Similarly, a distance 152 between the outer circumferential extent of the first flange 148 and the outer circumferential extent of the notch 144 is substantially similar to a distance 154 between the outer circumferential extent of the second flange 150 and the outer circumferential extent of the notch 144, thereby substantially centering the notch 144 within the alignment adapter 142. In other words, the notch 144 and the radially inward cavity 98 may be circumferentially centered about a central radial axis 107. Similar to the embodiment described above with regard to FIGS. 4-6, alternative alignment adapters 142 may be configured to circumferentially offset the keybar 82 relative to the spring bar 78 in the first circumferential direction 115 or the second circumferential direction 117. In this manner, the keybar dovetail 87 may be precisely aligned with the respective stator notch 71 despite variations in circumferential alignment between the spring bar 78 and the annular frame 66. This configuration may reduce generator construction costs compared to embodiments employing machined frames 66 and precisely aligned spring bars 78.

Movement of the keybar 82 relative to the spring bar 78 in the circumferential direction 79 may be limited by contact between the spring bar 78, the alignment adapter 142, and the keybar 82. Specifically, a width 156 of the notch 144 may be substantially similar to a width 158 of the machined recess 146 in the spring bar 78. Therefore, any force applied to the alignment adapter 142 by the keybar 82 in the circumferential direction 79 may be transferred to the spring bar 78 by contact between a first inner surface 160 and/or a second inner surface 162 of the spring bar recess 146, and a first outer surface 164 and/or a second outer surface 166 of the notch 144. As previously discussed, the spring bar 78 may be welded and/or bolted to the annular frame 66, thereby blocking circumferential movement of the spring bar 78. Therefore, the alignment adapter 142 may serve to block circumferential movement of the keybar 82 relative to the annular frame 66.

The keybar 82 may be circumferentially offset in the direction 115 by decreasing the width 108 of the first flange 148 and increasing the width 110 of the second flange 150. Similarly, the keybar 82 may be circumferentially offset in the direction 117 by increasing the width 108 of the first flange 148 and decreasing the width 110 of the second flange 150. Because the bolt 88 is secured to the keybar 82, movement of the keybar 82 in either direction 115 or 117 may cause the bolt 88 to move in the circumferential direction 79 within the bolt hole 92. Therefore, a width 168 of the bolt hole 92 may be configured to accommodate the maximum circumferential displacement of the bolt 88 with respect to the alignment adapter 142. In this manner, the alignment adapter 142 may enable circumferential alignment of the keybar 82 with the stator 70 despite variations in spring bar position with respect to the annular frame 66. Therefore, the spring bar 78 may be coupled to the annular frame 66 without expensive and time-consuming machining operations, thereby reducing generator construction costs.

Figure 8:
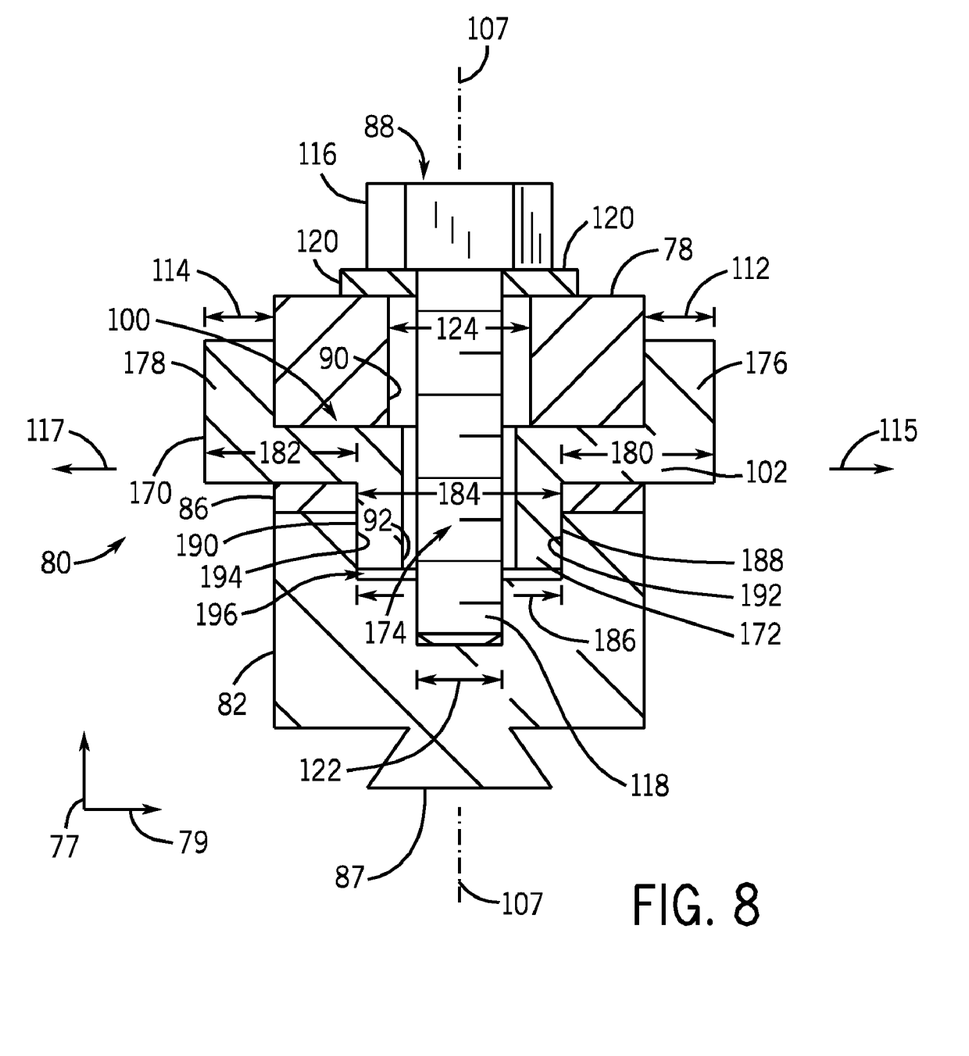
FIG. 8 is a cross-sectional front view of a second alternative embodiment of the spring bar, interface parts and the keybar in accordance with certain embodiments of the present technique.

FIG. 8 is a cross-sectional front view of a second alternative embodiment of the spring bar 78, interface parts 80 and the keybar 82. In the illustrated embodiment, the keybar 82 is substantially aligned with the spring bar 78 in the circumferential direction 79. However, the H-beam 84 described above with regard to FIGS. 4-6 has been replaced by an alternative stator alignment adapter 170 including a radially inward notch 172 and a radially outward cavity 100. The notch 172 is disposed within a machined recess 174 in the keybar 82, and the spring bar 78 is disposed within the radially outward cavity 100. The alignment adapter 170 includes a web 102, and a first flange 176 and a second flange 178, extending radially outward from the web 102 and forming the radially outward cavity 100. In the present configuration, a width 112 of the first flange 176 is substantially similar to a width 114 of the second flange 178, thereby substantially centering the radially outward cavity 100 between the flanges 176 and 178. Similarly, a distance 180 between the outer circumferential extent of the first flange 176 and the outer circumferential extent of the notch 172 is substantially similar to a distance 182 between the outer circumferential extent of the second flange 178 and the outer circumferential extent of the notch 172, thereby substantially centering the notch 172 within the alignment adapter 170. In other words, the notch 172 and the radially outward cavity 100 may be circumferentially centered about a central radial axis 107. Similar to the embodiment described above with regard to FIGS. 4-6, alternative alignment adapters 172 may be configured to circumferentially offset the keybar 82 relative to the spring bar 78 in the first circumferential direction 115 or the second circumferential direction 117. In this manner, the keybar dovetail 87 may be precisely aligned with the respective stator notch 71 despite variations in circumferential alignment between the spring bar 78 and the annular frame 66. This configuration may reduce generator construction costs compared to embodiments employing machined frames 66 and precisely aligned spring bars 78.

Movement of the keybar 82 relative to the spring bar 78 in the circumferential direction 79 may be limited by contact between the spring bar 78, the alignment adapter 170, and the keybar 82. Specifically, a width 184 of the notch 172 may be substantially similar to a width 186 of the machined recess 174 in the keybar 82. Therefore, any force applied to the keybar 82 in the circumferential direction 79 may be transferred to the alignment adapter 170 by contact between a first inner surface 188 and/or a second inner surface 190 of the keybar recess 174, and a first outer surface 192 and/or a second outer surface 194 of the notch 172. Similarly, any force applied to the alignment adapter 170 by the keybar 82 in the circumferential direction 79 may be transferred to the spring bar 78. As previously discussed, the spring bar 78 may be welded and/or bolted to the annular frame 66, thereby blocking circumferential movement of the spring bar 78. Therefore, the alignment adapter 170 may serve to block circumferential movement of the keybar 82 relative to the annular frame 66.

The keybar 82 may be circumferentially offset in the direction 115 by decreasing the distance 180 between the outer circumferential extent of the first flange 176 and the outer circumferential extent of the notch 172, and increasing the distance 182 between the outer circumferential extent of the second flange 178 and the outer circumferential extent of the notch 172. Similarly, the keybar 82 may be circumferentially offset in the direction 117 by increasing the distance 180 and decreasing the distance 182. As illustrated, the notch 172 may interfere with placement of the shim 86 between the alignment adapter 170 and the keybar 82. Therefore, in certain embodiments, two shims 86 may be employed, with one shim 86 positioned on each circumferential side of the notch 172. Applying the shims 86 in this location may establish a gap 196 between the inner radial extent of the notch 172 and the outer radial extent of the machined recess 174. The interface parts 80 (i.e., the alignment adapter 170 and the shims 86) may enable radial and circumferential alignment of the keybar 82 with the stator 70 despite variations in spring bar position with respect to the annular frame 66. Therefore, the spring bar 78 may be coupled to the annular frame 66 without expensive and time-consuming machining operations, thereby reducing generator construction costs.

Figure 9:
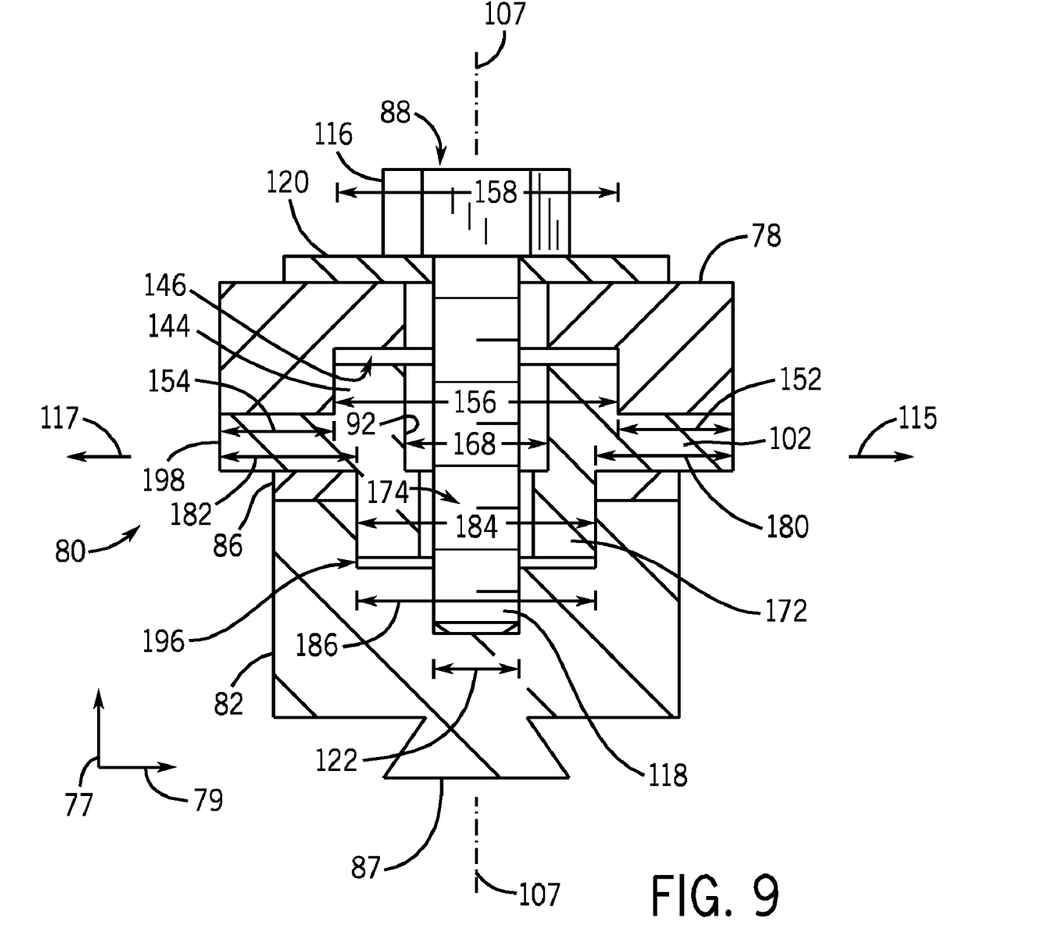
FIG. 9 is a cross-sectional front view of a third alternative embodiment of the spring bar, interface parts and the keybar in accordance with certain embodiments of the present technique.

FIG. 9 is a cross-sectional front view of a third alternative embodiment of the spring bar 78, interface parts 80 and the keybar 82. In the illustrated embodiment, the keybar 82 is substantially aligned with the spring bar 78 in the circumferential direction 79. However, the H-beam 84 described above with regard to FIGS. 4-6 has been replaced by an alternative stator alignment adapter 198, including the notch 172 extending radially inward from the web 102 and the notch 144 extending radially outward from the web 102. The notch 172 is disposed within the machined recess 174 in the keybar 82, and the notch 144 is disposed within the machined recess 146 in the spring bar 78. In the present configuration, the distance 152 between the outer circumferential extent of the web 102 in the direction 115 and the outer circumferential extent of the notch 144 in the direction 115 is substantially similar to the distance 154 between the outer circumferential extent of the web 102 in the direction 117 and the outer circumferential extent of the notch 144 in the direction 117, thereby substantially centering the notch 144 within the alignment adapter 198. Similarly, the distance 180 between the outer circumferential extent of the web 102 in the direction 115 and the outer circumferential extent of the notch 172 in the direction 115 is substantially similar to a distance 182 between the outer circumferential extent of the web 102 in the direction 117 and the outer circumferential extent of the notch 172 in the direction 117, thereby substantially centering the notch 172 within the alignment adapter 198. In other words, the notch 144 and the notch 172 may be circumferentially centered about a central radial axis 107. Similar to the embodiment described above with regard to FIGS. 4-6, alternative alignment adapters 198 may be configured to circumferentially offset the keybar 82 relative to the spring bar 78 in the first circumferential direction 115 or the second circumferential direction 117. In this manner, the keybar dovetail 87 may be precisely aligned with the respective stator notch 71 despite variations in circumferential alignment between the spring bar 78 and the annular frame 66. This configuration may reduce generator construction costs compared to embodiments employing machined frames 66 and precisely aligned spring bars 78.

Movement of the keybar 82 relative to the spring bar 78 in the circumferential direction 79 may be limited by contact between the spring bar 78, the alignment adapter 198, and the keybar 82. Specifically, the width 184 of the notch 172 may be substantially similar to the width 186 of the machined recess 174 in the keybar 82. In this configuration, any force applied to the keybar 82 in the circumferential direction 79 may be transferred to the alignment adapter 198. Similarly, the width 156 of the notch 144 may be substantially similar to the width 158 of the machined recess 146 in the spring bar 78. Therefore, any force applied to the alignment adapter 198 by the keybar 82 in the circumferential direction 79 may be transferred to the spring bar 78. As previously discussed, the spring bar 78 may be welded and/or bolted to the annular frame 66, thereby blocking circumferential movement of the spring bar 78. Therefore, the alignment adapter 198 may serve to block circumferential movement of the keybar 82 relative to the annular frame 66.

The keybar 82 may be circumferentially offset in the direction 115 by decreasing the distance 180 between the outer circumferential extent of the web 102 in the direction 115 and the outer circumferential extent of the notch 172 in the direction 115, and increasing the distance 182 between the outer circumferential extent of the web 102 in the direction 117 and the outer circumferential extent of the notch 172 in the direction 117. Similarly, the keybar 82 may be circumferentially offset in the direction 117 by increasing the distance 180 and decreasing the distance 182. As illustrated, the notch 172 may interfere with placement of the shim 86 between the alignment adapter 198 and the keybar 82. Therefore, in certain embodiments, two shims 86 may be employed, with one shim 86 positioned on each circumferential side of the notch 172. Applying the shims 86 in this location may establish the gap 196 between the inner radial extent of the notch 172 and the outer radial extent of the machined recess 174. The interface parts 80 (i.e., the alignment adapter 198 and the shims 86) may enable radial and circumferential alignment of the keybar 82 with the stator 70 despite variations in spring bar position with respect to the annular frame 66. Therefore, the spring bar 78 may be coupled to the annular frame 66 without expensive and time-consuming machining operations, thereby reducing generator construction costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
  a generator, comprising:
    a rotor having a rotational axis;
    a stator disposed about the rotor; and
    a framework disposed about the stator, wherein the framework comprises:
      an outer annular support;
      a spring bar coupled to the outer annular support, wherein the spring bar is aligned with the rotational axis;
      a keybar coupled to the stator, wherein the keybar is aligned with the rotational axis;
      an alignment adapter disposed radially between the spring bar and the keybar, wherein the alignment adapter comprises outer and inner recesses disposed radially opposite from one another relative to the rotational axis, the outer recess is configured to hold the spring bar, the inner recess is configured to hold the keybar, and the alignment adapter is configured to align the keybar to the stator in a circumferential direction via a circumferential position of the outer recess relative to the inner recess;
      wherein the inner recess is circumferentially off-center relative to the outer recess by a circumferential offset.
2. The system of claim 1, wherein the alignment adapter is selectable from a plurality of different alignment adapters, and each alignment adapter comprises a different circumferential offset between the inner recess and the outer recess.
3. The system of claim 1, comprising a radial adjustment shim disposed in the inner recess or the outer recess.
4. The system of claim 3, wherein the radial adjustment shim is selectable from a plurality of different radial adjustment shims, and each radial adjustment shim comprises a different radial thickness configured to adjust a radial offset between the spring bar and the keybar.
5. The system of claim 1, wherein the alignment adapter comprises an H-beam defining the inner and outer recesses, the H-beam comprises a bolt hole, a bolt extends radially through the bolt hole and couples to the keybar and the spring bar, and the bolt hole is oversized relative to a shaft of the bolt to enable movement of the keybar or the spring bar in the circumferential direction between the bolt and the H-beam.
6. The system of claim 1, comprising a turbine coupled to the generator via a shaft.
7. A system, comprising:
  a stator mounting system, comprising:
    a plurality of spring bars configured to mount to an annular frame in a first circumferentially spaced arrangement about a longitudinal axis of the annular frame;
    a plurality of keybars configured to mount to a stator in a second circumferentially spaced arrangement about the longitudinal axis; and
    an H-beam positioned radially between each spring bar and each keybar, each H-beam is configured to block circumferential movement of the respective keybar relative to the respective spring bar, and each H-beam is selectable from a plurality of H-beams having different alignment dimensions configured to facilitate circumferential alignment of the respective keybar relative to the respective spring bar;
    wherein each H-beam comprises a first cavity on a radially inward surface and a second cavity on a radially outward surface, the first cavity is configured to hold a respective keybar in a circumferential direction, the second cavity is configured to secure a respective spring bar in the circumferential direction, wherein the first cavity is circumferentially offset from the second cavity by an offset distance.

8. The system of claim 7, wherein the plurality of H-beams having different alignment dimensions comprises a set of H-beams with different offset distances between the first and second cavities.

9. The system of claim 7, wherein each H-beam is reversible to reverse the offset distance in the circumferential direction to an opposite circumferential direction.

10. The system of claim 7, comprising at least one radial adjustment shim positioned radially between each H-beam and the respective keybar to adjust a radial position of the respective keybar relative to the respective spring bar, wherein each radial adjustment shim is selectable from a plurality of radial adjustment shims having different thicknesses from one another.

11. The system of claim 7, wherein each H-beam defines radially inner and outer recesses, each H-beam comprises a radial bolt hole, a bolt extends radially through each radial bolt hole and couples to the respective keybar and the respective spring bar, and the radial bolt hole is oversized relative to a shaft of the bolt to enable movement of the respective keybar or the respective spring bar in a circumferential direction between the bolt and the H-beam.

12. A system, comprising:
a stator mounting kit, comprising:
a plurality of radial adjustment shims having different thicknesses from one another; and
a plurality of stator alignment adapters having different circumferential alignments between a keybar mount and a spring bar mount;
wherein the stator mounting kit is configured to enable radial and circumferential alignment between each spring bar and respective keybar in a stator framework via selection of one of the stator alignment adapters and selection of one or more of the radial adjustment shims;
wherein the plurality of stator alignment adapters comprises a plurality of H-beams, each H-beam defines an inner recess of the keybar mount and an outer recess of the spring bar mount, each H-beam has a circumferential distance between a first center of the inner recess and a second center of the outer recess, and the circumferential distance varies between the plurality of H-beams.

13. The system of claim 12, wherein each H-beam comprises a radial bolt hole, a bolt extends radially through each radial bolt hole and couples to the respective keybar and the respective spring bar, and the radial bolt hole is oversized relative to a shaft of the bolt to enable movement of the respective keybar or the respective spring bar in a circumferential direction between the bolt and the H-beam.

14. The system of claim 13, comprising a rotary machine having a stator disposed about a rotor, a plurality of keybars coupled to the stator in a first spaced apart circumferential arrangement about a rotational axis of the rotor, and a plurality of spring bars coupled to the stator framework in a second spaced apart circumferential arrangement about the rotational axis, wherein the stator mounting kit is used to align each keybar to a respective mounting position in the stator without machining.

* * * * *